United States Patent
Seago et al.

(10) Patent No.: US 9,736,267 B2
(45) Date of Patent: Aug. 15, 2017

(54) CLOUD PROVIDER SELECTION

(71) Applicant: Red Hat, Inc., Raleigh, NC (US)

(72) Inventors: Scott Wayne Seago, Warwick, MA (US); Angus Thomas, Horsham (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/155,989

(22) Filed: May 16, 2016

(65) Prior Publication Data

US 2016/0261713 A1 Sep. 8, 2016

Related U.S. Application Data

(63) Continuation of application No. 13/713,983, filed on Dec. 13, 2012, now Pat. No. 9,344,521.

(51) Int. Cl.
*H04L 29/08* (2006.01)
*H04L 12/911* (2013.01)
*G06F 9/455* (2006.01)

(52) U.S. Cl.
CPC .............. *H04L 67/32* (2013.01); *H04L 47/70* (2013.01); *H04L 67/10* (2013.01); *G06F 9/455* (2013.01)

(58) Field of Classification Search
None
See application file for complete search history.

(56) References Cited

U.S. PATENT DOCUMENTS

| 2007/0288638 | A1* | 12/2007 | Vuong | H04L 67/104 709/226 |
| 2010/0269109 | A1* | 10/2010 | Cartales | G06F 9/5072 718/1 |
| 2012/0137003 | A1* | 5/2012 | Ferris | H04W 4/003 709/226 |
| 2013/0042123 | A1* | 2/2013 | Smith | G06F 9/5094 713/300 |
| 2013/0297770 | A1* | 11/2013 | Zhang | G06F 9/505 709/224 |

* cited by examiner

*Primary Examiner* — Natisha Cox
(74) *Attorney, Agent, or Firm* — Lowenstein Sandler LLP (57) ABSTRACT

A system and method are disclosed for selecting a cloud provider for a virtual machine deployment. In one implementation, a processing device receives a request to launch a deployment of a virtual machine. The processing device identifies a set of two or more cloud providers, and determines a first subset of the set of cloud providers satisfying a requirement for the deployment of the virtual machine. A ranked list of cloud providers in the first subset is determined in view of a priority ranking criterion, and a probability distribution is generated in view of the ranked list. A cloud provider from the first subset is selected in view of the probability distribution, and the virtual machine is deployed in a cloud computing system of the selected cloud provider.

20 Claims, 5 Drawing Sheets

CLOUD PROVIDER SELECTION

CROSS-REFERENCE TO RELATED APPLICATIONS

This application is a continuation of U.S. patent application Ser. No. 13/713,983, filed Dec. 13, 2012, and hereby incorporated by reference.

TECHNICAL FIELD

Embodiments of the present disclosure relate to cloud computing and, more particularly, to a technique of cloud provider selection.

BACKGROUND

Cloud computing is generally becoming the platform of choice for businesses that want to reduce operating expenses and be able to scale resources rapidly. Eased automation, flexibility, mobility, resiliency, and redundancy are several of the advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud provider environment the next day. However, a variety of factors may impact which cloud provider would be most desirable for a particular set of virtual machines.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Embodiments of the disclosure are directed to a method and system for cloud provider selection for a launch of a deployment, where administrators have the ability to configure launch-time provider account selection policy for a pool of cloud providers or hosts. In an embodiment, the selection policy provides two-level prioritization, allowing one or both of a priority ranking and a probability distribution.

Initially, a set of valid matches (e.g., cloud providers or hosts that meet minimum requirements) is identified by a selection server. A selection policy for the deployment based on priority ranking criteria and probability ranking criteria is identified by the selection server. The selection server then determines a cloud provider based on the priority ranking criteria and the probability ranking criteria.

In one embodiment, the cloud provider is determined by placing the cloud providers into priority groups based on priority ranking criteria. Then, a probability distribution of the cloud providers in each priority group is determined based on the probability ranking criteria. Finally, a cloud provider is randomly selected from the highest-priority of the priority groups, based on the probability distribution.

In one embodiment, a pluggable infrastructure supports an administrator's selection of one or more selection policy modules that may be combined to create a custom selection policy for implementation by the selection server.

In another embodiment, both preference of matches (e.g., match 1 should be used before match 2 until match 1 is exhausted), which would be a priority ranking, and probabilistic distribution (e.g., match 1 is preferred over match 2 in a 3:1 ratio), which would be a probability ranking, are allowed. Priority ranking may be utilized to handle spillover (i.e., exhaustion of a group of matches), while probability ranking may be useful to distribute load across cloud providers taking relative capacity into account. An administrator can use one or both of these ranking types.

When considering a single launch, selecting the cloud provider with the highest priority ranking (or the best match) may be preferable. However, when there is a large volume of deployments, scale may become an issue. Here, if one cloud provider gathered more than 50% of the probability ranking, it would get 100% of the deployments, without the randomness. With the two-level prioritization, an administrator is able to use the probability distribution at launch for cloud providers that will be regularly used, while still retaining the ability to use strict priority ordering for a spillover case, i.e., a match that should be used if the better options are no longer available.

Figure 1:
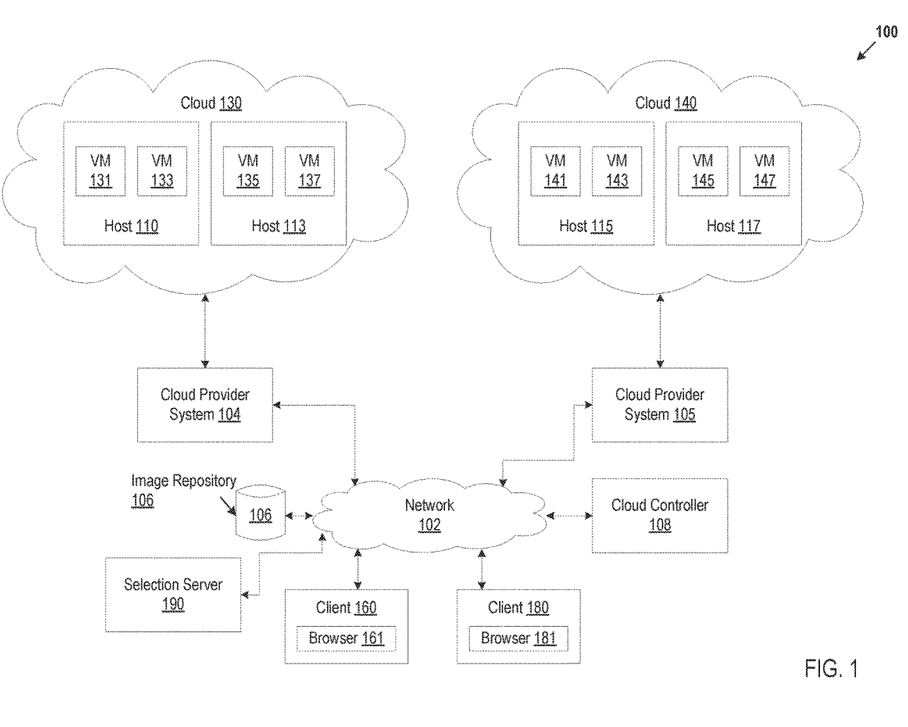
FIG. 1 illustrates exemplary system architecture, in accordance with various embodiments of the present disclosure.

FIG. 1 is a block diagram of a network architecture 100 for a distributed computing system, in which embodiments of the invention may operate. The network architecture 100 can include multiple clouds 130, 140 managed by various cloud provider systems 104, 105. There can be any number of clouds 130, 140 and cloud provider systems 114, 116. For brevity and simplicity, two clouds 130, 140 are used as an example throughout this document. In an embodiment, the network architecture includes clouds from multiple cloud providers or hosts. The clouds 130, 140 provide virtual machines. There can be any number of virtual machines in a cloud 130, 140. For brevity and simplicity, four virtual machines in each cloud 130, 140 are used as an example in architecture 100. For example, cloud 130, provides virtual machines 131, 133, 135, and 137, and cloud 140 provides virtual machines 141, 143, 145, and 147. Each virtual machine is hosted on a physical machine configured as part of the cloud 130, 140. Such physical machines are often located in a data center. For example, virtual machines 131 and 133 are hosted on host 110 in cloud 130 provided by cloud provider system 104, virtual machines 135 and 137 are hosted on host 113 in cloud 130 provided by cloud provider system 104, virtual machines 141 and 143 are hosted on host 115 in cloud 140 provided by cloud provider system 105, and virtual machines 145 and 147 are hosted on host 117 in cloud 140 provided by cloud provider system 105. The cloud provider systems 104, 105 and clouds 130, 140 may be provided as an infrastructure as a service (IaaS) layer. The cloud provider systems 104, 105 and clouds 130, 140 may be provided by, for example, a third party cloud provider or a private party. For example, cloud provider system 104 and cloud 130 may be provided by Cloud-Provider-1, and cloud provider system 105 and cloud 140 may be provided by Cloud-Provider-2. A cloud provider can provide more than one type of cloud provider system 104, 105 and more than one type of cloud 130, 140. The cloud provider can be an entity. An entity, as referred to here, can represent any person, a business organization such as a corporation, an educational institution such as a college or university, etc. Users can interact with applications executing on cloud-based virtual machines using client computer systems, such as clients 160, 180, via corresponding web browser programs 161, 181. Users may have one or more accounts associated with a cloud provider system 104, 105.

Clients 160, 180 are connected to hosts 110, 113, 115, 117 and the cloud provider system 104, 105 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113, 115, 117 may be a server computer system, a desktop computer or any other computing device. The cloud provider system 104, 105 may include one or more machines such as server computers, desktop computers, etc.

In one embodiment, the cloud provider system 104, 105 is coupled to a cloud controller 108 and a selection server 190 via the network 102. The cloud controller 108 and selection server 190 may reside on the same machine or different machines (e.g., server computers, desktop computers, etc.). The cloud controller 108 and selection server 190 may be maintained by a cloud consumer of cloud 130, 140 such as an enterprise (e.g., business, company). In another embodiment, the cloud controller 108 and selection server 190 may be maintained by a third party cloud provider. In yet another embodiment, the cloud controller 108 and/or selection server 190 may be part of the cloud provider system 104, 105.

The cloud controller 108 may manage the execution of applications in the cloud 130, 140. The cloud controller 108 may receive input, for example, from a system administrator via a client 160, 180, describing VMs 131, 133, 135, 137, 141, 143, 145, 147 to be deployed in the cloud 130, 140 for execution of the applications. A VM may execute one or more applications. Alternatively, several VMs may be used to execute a single application (a composite application), with each virtual machine executing one or more components of a composite application. An image repository 106 can be populated with application deployment data to be used to deploy the VMs 131, 133, 135, 137, 141, 143, 145, 147. In one embodiment, the cloud controller 108 generates the application deployment data based on the user input and stores the application deployment data in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, along with any software requirements, such as additional software packages to be installed, beyond the base operating system, additional configuration which may be required, for example, network ports on which services should be made available, and specific targeting information to instantiate a virtual machine, for example, a hardware profile, which specifies an amount of RAM, and a number of virtual CPUs. The application deployment data can be a hierarchy of data that includes deployables, assemblies, and templates. Each deployable describes an overview of one or more virtual machines to be deployed as a group. A deployable can describe any number of arbitrarily large and complex deployments of virtual machines or a small number of virtual machines. For brevity and simplicity, a deployment of four virtual machines is used as an example in architecture 100. A deployable can be described by an XML file.

An assembly is a description of a virtual machine to be deployed. An assembly can be described by an XML file. An assembly can include the description of a service to be provided by a virtual machine, the description of a service to be used by a virtual machine, and the description of one or more parameter values to be provided to or relied upon by a virtual machine. The following is an example of a deployable definition, including assemblies:

```
<?xml version="1.0"?>
<deployable version="1.0" name="test">
<description/>
<assemblies>
<assembly hwp="small-x86_64" name="test1">
<image id="aeaeb15e-1eb3-11e2-b10e-52540028e9a5"/>
</assembly>
<assembly hwp="small-x86_64" name="test2">
<image id="aeaeb15e-1eb3-11e2-b10e-52540028e9a5"/>
</assembly>
<assembly hwp="small-x86_64" name="test3">
<image id="aeaeb15e-1eb3-11e2-b10e-52540028e9a5"/>
</assembly>
</assemblies>
</deployable>
```

A template is a description of a disk image and meta-data for creating a virtual machine image. A virtual machine image can be created based on a template. A virtual machine image can be launched to instantiate (create) a virtual machine in a cloud. A template can be described by an XML file. The following is an example of an image template:

```
<template>
<name>f15jeos</name>
<os>
<name>Fedora</name>
<version>15</version>
<arch>x86_64</arch>
<install type='url'>
<url>http://download.devel.redhat.com/released/F-15/
   GOLD/Fedora/x86_64/os/</url>
</install>
<rootpw>test</rootpw>
</os>
<description>Fedora 15</description>
</template>
```

Returning to FIG. 1, upon receiving a command identifying a specific deployable to launch, the cloud provider system 104, 105 retrieves a reference to the existing image for each virtual machine available to be run/cloned on top of a hypervisor (not shown). If the image is not in the image repository 106, other elements may be used to place the image in the repository 106. The command may be received from the cloud controller 108 or a user (e.g., a system administrator) via a console computer or a client machine. The images can be launched in the cloud 130, 140 to instantiate the virtual machines 131, 133, 135, 137, 141, 143, 145, 147 for the deployable. Launch of a virtual machine can include powering on or booting a virtual machine.

The selection server 190 can detect the VMs 131, 133, 135, 137, 141, 143, 145, 147 that have been started (e.g., powered on or booted) for a deployable. The selection server 190 can communicate with agents running in the VMs and with the image repository 106 to retrieve application deployment data. When a virtual machine image is launched (e.g., powered-on, booted) on a host in the cloud 130, 140 the agent executes in a corresponding virtual machine to communicate with the selection server 190.

The selection server 190 determines a set of matches from a pool of cloud providers that meet minimum requirements to launch a deployment. The selection server 190 then identifies priority ranking criteria and probability ranking criteria from a selection policy, and then determines one of the cloud providers for the deployable launch from the set of matches based on the priority ranking criteria and the probability ranking criteria.

Each agent can provide a unique identifier (UID) to the selection server 190 to represent a corresponding virtual machine. A UID can include a situationally unique (or a contextually unique) identifier.

Figure 2:
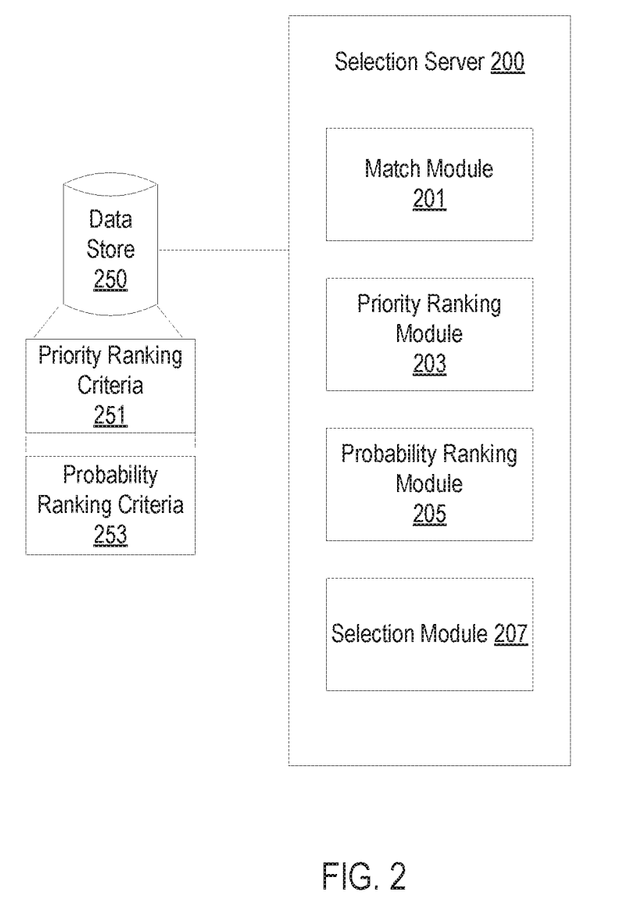
FIG. 2 is a block diagram of a selection server, in accordance with an embodiment.

FIG. 2 illustrates a block diagram of one embodiment of selection server 200. In one embodiment, the selection server 200 can be the same as the selection server 190 of FIG. 1. Selection server 200 includes a priority ranking module 201, a probability ranking module 203, and a selection module 205. Note that in alternative embodiments, the selection server 200 may include more or less modules than those shown in FIG. 2. Also, one or more of the priority ranking module 201, probability ranking module 203, and/or selection module 205 may be combined into a single module. Additionally, the functionality of any of the priority ranking module 201, probability ranking module 203, and selection module 205 may be divided between multiple modules.

The selection server 200 uses a selection policy defined by an administrator or user to use for selecting a cloud provider for launch of a deployment. In an embodiment, the selection policy provides two-level prioritization of matching cloud providers, and includes priority ranking criteria and probability ranking criteria to allow one or both of a priority ranking and a probability distribution to be used to select the cloud provider for a launch. The selection policy may be stored in data store 250, and a user may define the selection policy using a graphical user interface (GUI) accessed via a client 160, 180. Further, in an embodiment, the user can select one or more selection policy modules for the priority ranking criteria and the probability ranking criteria that may be combined for implementation by the selection server 200.

The match module 201 determines a set of valid matches from cloud providers in a pool. Providers that meet the minimum requirements for a launch of a deployment are considered valid matches, where the minimum requirements may be specified in the application deployment data. For example, these requirements may include a matching provider hardware profile (e.g., the cloud provider can launch virtual machines whose attributes, such as RAM and virtual CPUs, are a close approximation of the attributes requested by the launcher), a matching provider realm (e.g. the specified range of permissible environments in which the deployment could be launched includes at least some sub-component of the hosting capacity presented by the cloud provider), images have been pushed, which is to say that bootable machine images which correspond to the specification contained in the deployable definition are already accessible to the cloud provider and available for immediate use, quota is not exceeded (e.g., a limit has been set by an administrator on the total amount of resources that the user who is requesting the deployment launch can consume has not been exceeded), etc.

The priority ranking module 203 can receive priority ranking criteria 251 (e.g., parameters such as cost, performance, reliability, internal versus external cloud provider, provider type, provider capacity, and/or date/time of deployment) from a user, e.g., an administrator, which can be stored in data store 250. In an embodiment, the priority ranking criteria 251 are specified in a selection policy. The priority module 203 also ranks the matches according to the priority ranking criteria 251 to determine a priority ranking, and groups matches that have the same ranking in priority groups.

For example, each matching cloud provider may be given a score based on the selected priority ranking criteria, such as a reliability parameter where the user could specify that cloud providers with reliability in a certain range receive a certain score. In this example, the minimum requirement for reliability is that the cloud providers should have successfully launched attempted deployments no less than 90% of the time. The priority module 203 can assign scores based on the following: cloud providers that successfully launched attempted deployments more than 99% of the time receive a score of 5, cloud providers that successfully launched attempted deployments between 97% and 99% of the time receive a score of 4, cloud providers that successfully launched attempted deployments between 95% and less than 97% of the time receive a score of 3, cloud providers that successfully launched attempted deployments between 93% and less than 95% of the time receive a score of 2, and cloud providers that successfully launched attempted deployments between no less than 90% and less than 93% of the time receive a score of 1. The priority module 203 can then group all of the cloud providers that receive a score of 5 into a first group, all of the cloud providers that receive a score of 4 into a second group, all of the cloud providers that receive a score of 3 into a third group, all of the cloud providers that receive a score of 2 into a fourth group, and all of the cloud providers that receive a score of 1 into a fifth group.

The probability module 205 can receive probability ranking criteria 253 (e.g., parameters such as cost, performance, reliability, internal versus external cloud provider, provider type, provider capacity, and/or date/time of deployment) from a user, which may be specified in the selection policy, and the probability ranking criteria 253 can be stored in a data store 250. Within each priority group, the probability module 205 then determines a probability distribution or probability ranking according to the probability ranking criteria 253. In other words, the probability module 205 determines how likely each cloud provider is to be selected to host the new deployment, which can be expressed as a percentage.

In one example, the cloud providers in each group are assigned a probability based on the selected probability criteria, such as a capacity parameter where the user could specify that cloud providers with a certain capacity receive a certain probability. In this example, there are three cloud providers (e.g., provider A, provider B, and provider C) in the first priority group, and provider A has double the capacity of provider B and provider C, so the probability module 205 assigns provider A with the larger capacity a probability of being selected that is double the probability of being selected assigned to providers B and C with the smaller capacities. Here, provider A is assigned a probability of being selected of 50%, and providers B and C are assigned probabilities of being selected of 25% each. In one embodiment, provider A is assigned numbers 1-50, provider B is assigned numbers 51-75, and provider C is assigned numbers 76-100.

The selection module 207 can then select a cloud provider for the launch according to the probability distribution. In one embodiment, the selection module 207 can select a random number from 1 to 100 to determine which of the corresponding cloud providers should be selected according to the probability distribution from the highest priority group with available matches. In the example above, if the selection module 207 selects "25" as the random number, then provider A will be selected as the provider for the launch if it is available because "25" is assigned to provider A. In another example, if the selection module 207 selects "51" as the random number, then provider B will be selected as the provider for the launch if it is available because "51" is assigned to provider B. In yet another example, if the selection module 207 selects "100" as the random number, then provider C will be selected as the cloud provider for the launch if it is available. If none of cloud providers in the highest priority group is available, then the selection module will then select a cloud provider from the next highest priority group according to the probability ranking criteria for that group.

Figure 3:
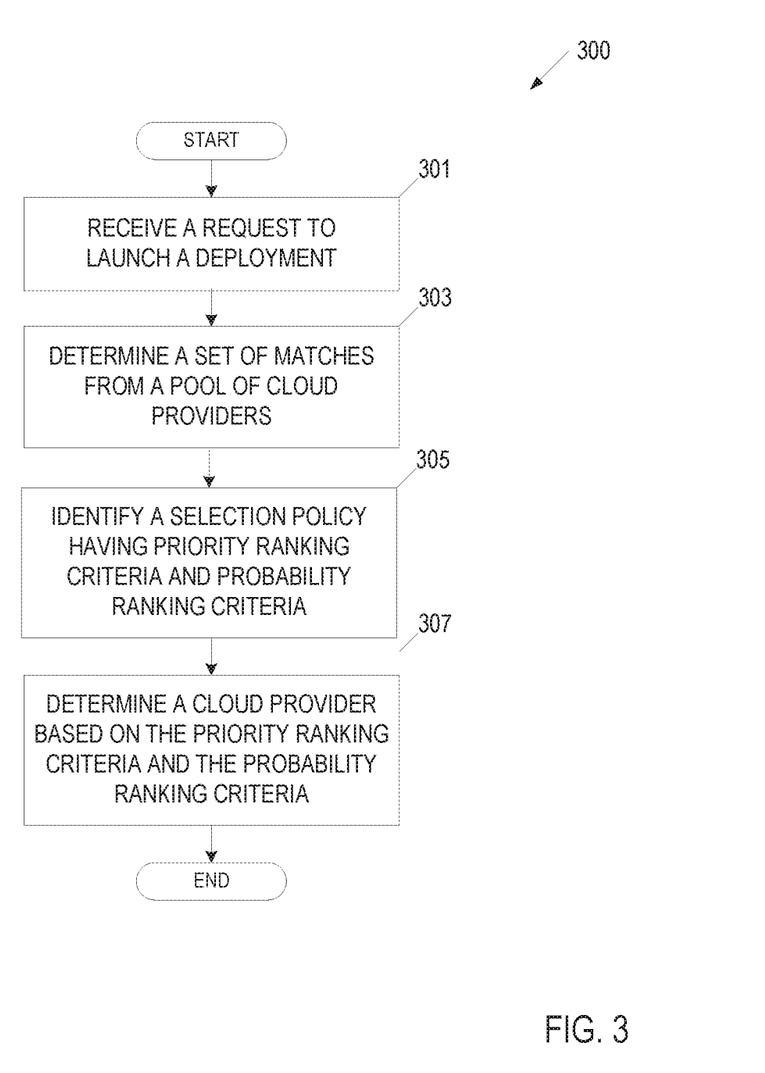
FIG. 3 is a flow diagram illustrating an embodiment of a method of cloud provider selection.

FIG. 3 is a flow diagram of an embodiment of a method 300 for cloud provider selection. The method 300 is performed by processing logic that may comprise hardware (circuitry, dedicated logic, etc.), software (such as is run on a general purpose computer system or a dedicated machine), or a combination of both. In one embodiment, the method 300 is performed by the selection server 200 of FIG. 2.

At block 301, the cloud controller 108 receives a request to launch a deployment from a system administrator via a client 160, 180, and requests the selection server 200 to determine a cloud provider for the deployment.

At block 303, the selection server 200 determines a set of valid matches from a pool of cloud providers, where valid matches meet the minimum requirements for the deployment. For example, the match module 201 of FIG. 2 determines a set of cloud providers that are valid matches from a pool of available cloud providers. Cloud providers that meet the minimum requirements, e.g., specified in the application deployment data, for the launch are deemed valid matches.

For example, a match is a particular combination of a cloud provider account, a provider hardware profile, a provider realm (which can be nil). A provider realm is a logical subdivision of the capacity presented by a single cloud provider. Distinct realms may represent some degree of physical separation. A provider image is a bootable machine image which corresponds to the specification contained in the deployable definition and is accessible to the cloud provider and available for immediate use. A provider account is matched when each of the criteria is met, ensuring that a suitable provider hardware profile exists, the required images(s) are in place, the user's quota is not exceeded, etc. When all of those conditions are verified, the provider account is considered to have been successfully matched.

In an example, there are four cloud provider accounts: John Doe at ec2-us-east, Jane Smith at ec2-us-west, Administrator account on a local RHEV (Red Hat Enterprise Virtualization) cloud provider, and John Doe on an openstack provider. A user wants to launch a single instance deployment "Jboss Server" using an image that has been uploaded to both EC2 accounts and the RHEV account, using a Hardware Profile "medium" for which the EC2 accounts and the OpenStack account have appropriate hardware profile matches, and choosing a realm called "external" which happens to include the ec2 providers and the OpenStack provider. The list of valid matches here will include both ec2 provider accounts. The RHEV account is eliminated because there is no valid Hardware Profile match. The OpenStack provider is eliminated because there is no appropriate image available for launch on that cloud provider.

At block 305, the selection server 200 identifies a selection policy for the deployment (e.g., based on the type of deployment or based on user input specifying a particular selection policy). The selection policy includes priority ranking criteria and probability ranking criteria for the deployment. In an embodiment, the selection server 200 provides two-level prioritization of the set of matching cloud providers, allowing one or both of a priority ranking and a probability distribution as specified in the selection policy.

For example, the priority ranking module 203 receives priority ranking criteria 251 from a user, e.g., an administrator. Here, the user would enter the priority ranking criteria into the selection policy for a deployment, and the priority ranking module 203 would reference the selection policy to retrieve the priority ranking criteria.

In an embodiment, the priority ranking criteria can include parameters such as cost, performance, reliability, internal versus external cloud provider, provider type, provider capacity, and/or date/time of deployment. For example, cloud providers with an associated cost in a certain range may be ranked higher than cloud providers with an associated cost in a higher range. In another example, cloud providers with capacity in a certain range may be ranked higher than cloud providers with capacity in a lower range.

Further, the probability module 205 can receive probability ranking criteria 253 from a user. Here, the user would enter the priority ranking criteria into the selection policy for the deployment (e.g., via the GUI), and the probability ranking module 205 would reference the selection policy to retrieve the probability ranking criteria.

In an embodiment, the probability ranking criteria can include parameters such as cost, performance, reliability, internal versus external cloud provider, provider type, provider capacity, and/or date/time of deployment. For example, cloud providers with an associated cost in a certain range may be assigned a higher probability than cloud providers with an associated cost in a higher range. In another example, cloud providers with capacity in a certain range may be assigned a higher probability than cloud providers with capacity in a lower range.

In other words, the selection policy provides two-level prioritization, allowing one or both of a priority ranking and a probability distribution such that cloud providers in the set of valid matches are first ranked and grouped in priority groups according to priority ranking criteria. Then, the cloud providers of each priority group are assigned a probability of being selected according to the probability ranking criteria.

At block 307, processing logic in the selection server 200 determines a cloud provider based on the priority ranking criteria and the probability ranking criteria. In an example, the selection module 207 randomly selects a cloud provider for the launch according to the priority ranking criteria and the probability ranking criteria. Here, the selection module 207 selects a cloud provider from the highest available priority group according to the probability distribution of that group. In other words, though the selection module 207 randomly selects a cloud provider, some cloud providers are more likely to be selected than others due to the probability distribution (i.e., weighting) assigned to each cloud provider. The selection server 200 can then send the selected cloud provider to the cloud controller 108, and the cloud controller 108 can then launch the deployment on the selected cloud provider.

Figure 4:
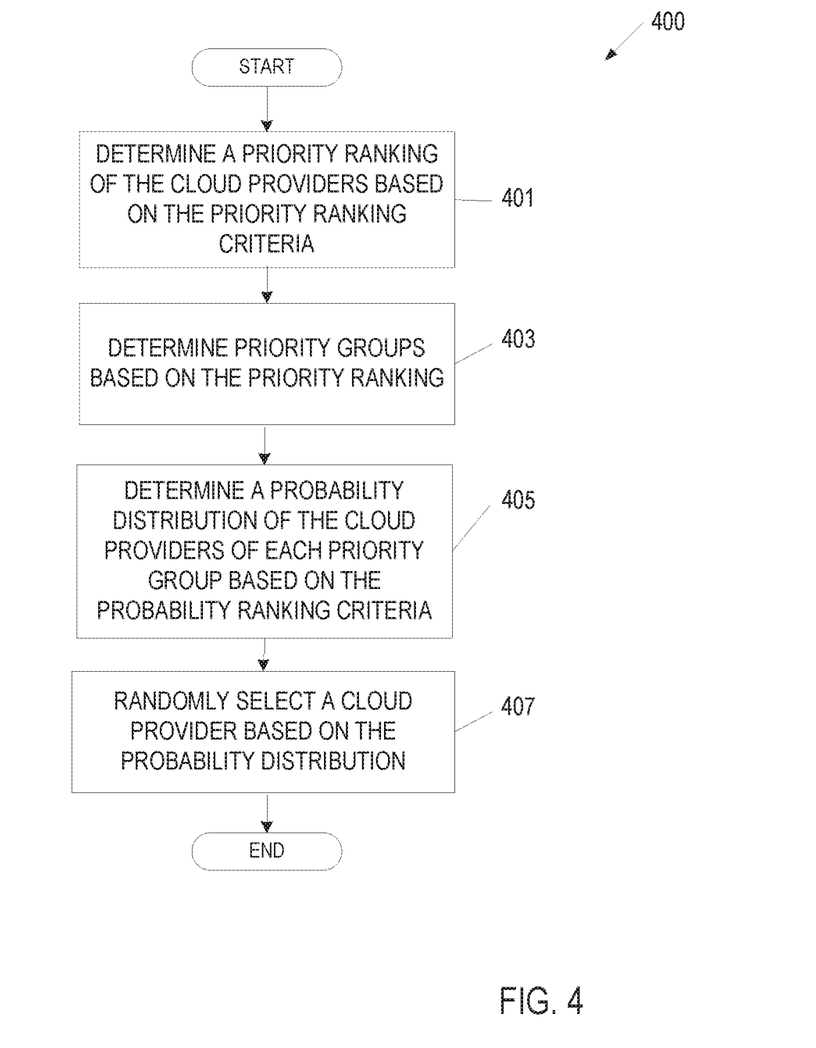
FIG. 4 is a flow diagram illustrating another embodiment of a method of cloud provider selection.

FIG. 4 is a flow diagram of an embodiment of a method 400 for determining a cloud provider based on priority ranking criteria and probability ranking criteria (e.g., block 307 of FIG. 3). The method 400 is performed by processing logic that may comprise hardware (circuitry, dedicated logic, etc.), software (such as is run on a general purpose computer system or a dedicated machine), or a combination of both. In one embodiment, the method 400 is performed by the selection server 200 of FIG. 2.

At block 401, the selection server 200 determines a priority ranking of the cloud providers based on the priority ranking criteria. Here, the priority module 203 ranks the matches according to the priority ranking criteria 251 to determine a priority ranking. For example, the priority module 203 evaluates potential cloud providers for the launch based on one or more parameters, (e.g., cost, performance, reliability, internal versus external cloud provider, provider type, provider capacity, and/or date/time of deployment) defined as priority ranking criteria in the selection policy. For example, each matching cloud provider may be given a score based on the selected priority ranking criteria, such as a cost parameter where the user could specify that cloud providers with costs in a certain range receive a certain score. In this example, the minimum requirement for cost is that the cloud providers should not cost more than X dollars per unit of time. The priority module 203 can assign scores based on the following: provider accounts that cost less than 80% of X receive a score of 5, provider accounts that cost between 80% and less than 85% of X receive a score of 4, provider accounts that cost between 85% and less than 90% of X receive a score of 3, provider accounts that cost between 90% and less than 95% of X receive a score of 2, and provider accounts that cost between 95% and 100% of X receive a score of 1.

At block 403, the selection server 200 determines priority groups based on the priority ranking criteria, and groups matches that have the same ranking in priority groups. Using the example above, the priority module 203 groups all of the cloud providers that receive a score of 5 into a first group, all of the cloud providers that receive a score of 4 into a second group, all of the cloud providers that receive a score of 3 into a third group, all of the cloud providers that receive a score of 2 into a fourth group, and all of the cloud providers that receive a score of 1 into a fifth group.

In other embodiments, the selection policy includes two or more priority ranking criteria. Here, each cloud provider may receive a score for each of the priority criterion, as similarly described above. The priority module 203 would then tally the scores for each cloud provider, and group the cloud providers according to score or according to scores that fall in a particular range (e.g., cloud providers with scores from 9-10 are in the first group, cloud providers with scores from 7-8 are in the second group, etc.).

At block 405, the selection server 200 determines a probability ranking of the cloud providers within each priority group based on the probability ranking criteria. Within each priority group, the probability module 205 determines a probability distribution according to the probability ranking criteria 253 to determine how likely each cloud provider is to be selected to host the next deployment. Here, the probability module 203 evaluates potential cloud providers for the launch based on one or more parameters (e.g., cost, performance, reliability, internal versus external cloud provider, provider type, provider capacity, and/or date/time of deployment) defined as probability ranking criteria in the selection policy. For example, each cloud provider can be assigned a percentage for likelihood of being selected by the selection server.

In one example, the cloud providers of each group are assigned a probability based on the selected probability criteria, such as an internal versus external parameter where the user could specify that internal (i.e., private) cloud providers receive a certain probability and external (i.e., public) cloud providers receive a different probability. For example, the user could specify that internal cloud providers should be twice as likely to be selected as external cloud providers. In this example, there are three cloud providers (e.g., provider A, provider B, and provider C) in the first priority group. Provider A is an internal provider, and providers B and C are external providers. Here, the probability module 205 assigns internal provider A a probability of being selected that is double the probability of being selected assigned to the external providers B and C, where provider A is assigned a probability of being selected of 50%, and providers B and C are assigned probabilities of being selected of 25% each. In one embodiment, provider A is assigned numbers 1-50, provider B is assigned numbers 51-75, and provider C is assigned numbers 76-100.

At block 407, the selection server 200 randomly selects a cloud provider based on the selection policy. For example, the selection module 207 will select matches in the top priority group first according to the probability distribution. For example, the selection module 207 can select a random number from 1 to 100 to determine which of the corresponding cloud providers should be selected, according to the probability distribution. If there are no matches in the top priority group available, a match in the next, i.e., second to top, priority group will be selected according to the probability distribution. If there are no matches in the top or second to top priority groups available, a match in the next, i.e., third to top, priority group will be selected according to the probability distribution. The selection server 200 will then continue to select matches in the next lower priority group when no matches in higher priority groups are unavailable.

In the example above, if the selection module 207 selects "49" as the random number, then provider A will be selected as the cloud provider for the launch if it is available because "49" is assigned to provider A. In another example, if the selection module 207 selects "75" as the random number, then provider B will be selected as the cloud provider for the launch if it is available because "75" is assigned to provider B. In yet another example, if the selection module 207 selects "76" as the random number, then provider C will be selected as the cloud provider for the launch if it is available because 76 is assigned to provider C. If none of the cloud providers in the highest priority group is available, then the selection module will then select a cloud provider from the next highest priority group according to the probability ranking criteria for that group.

In one embodiment, priority-only policies may be selected by assigning one match to each priority group. Here, since there is only one match to choose from in each group, the probability distribution is not relevant to the selection process because there is a 100% chance that the match in the highest priority group available will be selected. Therefore, the match in the top priority group will be selected first. When the match in the top priority group is no longer available, the match in the next, i.e., second to top, priority group will be selected. When the match in the second to top priority group is no longer available, the match in the next, i.e., third to top, priority group will be selected. The selection server 200 will then continue to select matches in the next lower priority group as matches in higher priority groups become unavailable. Here, since the selection policy is pluggable, priority ranking may be dynamically determined. In other words, the user can adjust the priority ranking criteria in real-time based the availability of cloud providers. For example, the user may view the currently selected criteria and cloud provider availability via the GUI, and use this information to alter the selections.

In an embodiment, probability-only policies are possible by placing all matches in a single priority group. In other words, all cloud provider matches are in one priority group so a single probability distribution will include all of the matches. Here, all matches are considered under the probability ranking criteria, such that the probability distribution will include all of the matches.

In one embodiment, a pluggable infrastructure supports a user selection of one or more selection policy modules that may be combined to create a custom selection policy for implementation by the selection server. For example, the user may select one or more particular selection policy modules for the priority ranking criteria and one or more particular selection policy modules for the probability ranking criteria. The selection policy modules allow the user to specify parameters such as cost, performance, reliability, internal versus external cloud provider, provider type, provider capacity, and/or date/time of deployment.

The selection of the cloud provider by the selection server is then based on all of the selection policy modules selected for the priority ranking criteria and all of the selection policy modules selected for the probability ranking criteria. In an embodiment, the user could weight certain selected modules differently (e.g., higher or lower) than other selected modules.

In one embodiment, though the selection policies are combinable (or stackable), one of either the round robin, with optional weighting, policy or the least used, with optional weighting, policy is selected for the initial provider account selection. The use of one of these policies would provide an initial set of percentages. For example, with four available provider accounts, the round robin policy would set the initial probability for each provider account to 25%. Each provider account's probability of being selected might then be altered by whichever policies were included in the stack.

For the round robin, with optional weighting, of one embodiment, the selection server 200 uses (or weights) each of the available cloud providers equally by assigning the same probability to each of them. Optionally, the selection server 200 may vary the probabilities by assigning weights in instances where cloud providers are of differing sizes, for example, if there are three cloud providers and one has double the capacity of the other two. Here, the administrator may adjust the weighting ratios to more closely reflect the actual capacities of cloud provider (e.g., one provider has a 50% probability of being selected and the other two have a 25% probability of being selected). Further, in this embodiment, the cloud providers are not selected in strict rotation, as in a 'round robin', though the overall result is the same over time.

For the least used, with optional weighting, policy of one embodiment, the selection server 200 selects the least used cloud provider, but may optionally weight the cloud providers. This probability-only policy particularly applies when the cloud controller 108 is the only means by which deployments are launched on cloud providers. Here, the cloud controller would need to maintain a count of the total amount of use of each provider account, which would not be possible if the provider account was simultaneously being used by a means which did not include the cloud controller. The cloud controller 108 would seek to ensure that the usage of the cloud providers was balanced, by giving a higher probability to whichever cloud providers are currently least used. As with round robin, the weightings could be adjusted to reflect differing capacities between providers.

Having used either the round robin, with optional weighting, policy or the least used, with optional weighting, policy to acquire an initial set of probabilities, administrators could then elect to apply, (or combine or stack), one or more additional policies, such as the policies described below, to define a custom selection policy. The administrator could define a selection policy for cloud providers in a specific pool, and/or a global default selection policy to apply in pools of cloud providers where no custom policy is defined.

For example, for an assigned priority policy of one embodiment, the probability assigned to each cloud provider would be adjusted according to the cloud provider's priority, e.g., by increasing the probability ranking percentage of the higher priority cloud provider at the expense of the lower priority accounts. This could be done either as a strict priority ranking or as a probabilistic one.

For a punishing failure policy of one embodiment, for each occurrence of a launch failure within a configurable period (e.g., 6 hours), a provider account would be fined 5% from its probability ranking. This would serve to reduce the attempts to launch on a cloud provider that is running out of capacity, experiencing hardware issues, etc. This is a probability-only policy.

For a cost policy of one embodiment, if the amount of network bandwidth that a deployment will consume is known because, for example, a deployment is for a streaming media server, then administrators can minimize costs by only launching that deployment in a "low cost bandwidth" cloud provider. To allow cost to affect the probability rankings, a cost per realm, per hour, for each provider hardware profile, for each cloud provider is needed. Administrators may enter cost data themselves or the cost data may be automatically entered into the cloud provider information. In one embodiment, the cloud provider's application programming interface (API) exports cost information.

Adjusting the probability of each cloud provider to favor which ever cloud provider more cheaply hosts the specific range of hardware profiles would be done by increasing the selection probability percentages of less expensive cloud providers by a configurable amount at the expense of more costly cloud providers.

Cost may lend itself to priority-only ranking. If the goal is to match to the lowest-cost match, lower-cost options may be fully utilized before moving to higher-cost matches. In other words, the lowest cost match may be assigned to the top priority group, the second lowest cost match may be assigned to the second priority group, the third lowest cost match may be assigned to the third priority group, etc.

Once the calculations for the stack of policies are completed, the result is a final set of probabilities. At this point, selection server 200 would randomly select a number and a launch would then be attempted on the corresponding cloud provider.

In one embodiment, the GUI that allows administrators to select policies and to tune the parameters associated with the policies could give a real-time representation of the effect of the current settings for a specific deployable. Here, administrators could view an immediate change in resultant probability ranking percentages, e.g., in a pie chart.

In one embodiment, administrators could implement their own selection policies, e.g., according to date and time to increase usage of private cloud providers at times when it would otherwise be relatively idle, to prefer external (public) cloud providers or internal (private) cloud providers, or to consider capacity, reliability, or performance of a cloud provider.

Figure 5:
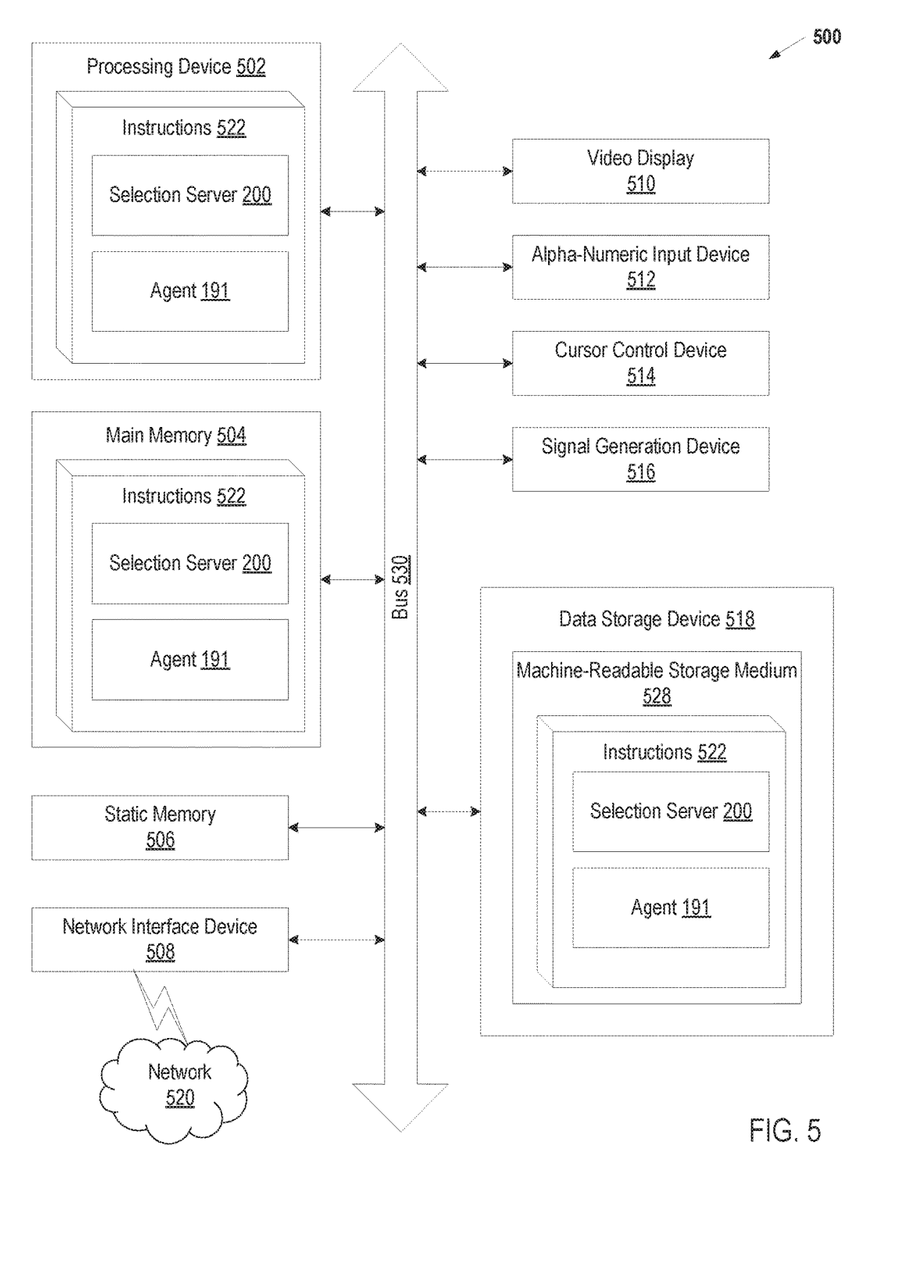
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a selection server (e.g., selection server 200 of FIG. 2), an agent (e.g., agent 191A-D of FIG. 1) and/or a software library containing methods that call a selection server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processing device, a request to launch a deployment of an application;
    identifying a first virtual machine;
    retrieving from a second virtual machine, by the processing device, application deployment data for deploying the application within the first virtual machine;
    identifying, by the processing device, a set of two or more cloud providers;
    determining a first subset of the set of cloud providers satisfying a requirement for the deployment of the application within the first virtual machine;
    determining, in view of a priority ranking criterion, a ranked list of cloud providers in the first subset;
    generating a probability distribution in view of the ranked list of cloud providers in the first subset;
    selecting, in view of the probability distribution, a cloud provider from the first subset to host the application within the first virtual machine; and
    deploying, in a cloud computing system of the selected cloud provider, an execution of the application within the first virtual machine.

2. The method of claim 1 wherein the probability distribution assigns respective probabilities to cloud providers in a highest-ranked priority group of the ranked list of cloud providers.

3. The method of claim 2, wherein the selected cloud provider is selected from a second-highest-ranked priority group of the ranked list of cloud providers when the cloud providers in the highest-ranked priority group are unavailable.

4. The method of claim 1, wherein the priority ranking criterion pertains to at least one of cost, performance, reliability, or capacity.

5. The method of claim 1, wherein the generating of the probability distribution is further in view of at least one of a date for the deployment or a time for the deployment.

6. The method of claim 1, wherein the requirement pertains to a number of virtual central processing units of the virtual machine.

7. The method of claim 1, wherein the requirement pertains to a provider hardware profile.

8. A system comprising:
    a memory; and
    a processing device, operatively coupled to the memory, to:
        receive a request to launch a deployment of an application;
        identify a first virtual machine;
        retrieve from a second virtual machine, by the processing device, application deployment data for deploying the application within the first virtual machine;
        identify a set of cloud providers satisfying a requirement for the deployment of the application within the first virtual machine;
        generate, in view of a priority ranking criterion, a ranked list of the cloud providers in the set;
        generate a probability distribution in view of the ranked list of cloud providers;
        select, in view of the probability distribution, a cloud provider from the set to host the application within the first virtual machine; and
        deploy, in a cloud computing system of the selected cloud provider, an execution of the application within the first virtual machine.

9. The system of claim 8, wherein the processing device is further to partition the ranked list into a plurality of ranked priority groups, and wherein the probability distribution assigns respective probabilities to cloud providers in a highest-ranked priority group.

10. The system of claim 9, wherein the selected cloud provider is selected from a second-highest-ranked priority group of the ranked list of cloud providers when the cloud providers in the highest-ranked priority group are unavailable.

11. The system of claim 8, wherein the priority ranking criterion pertains to at least one of cost, performance, reliability, or capacity.

12. The system of claim 8, wherein the generating of the probability distribution is further in view of at least one of a date for the deployment or a time for the deployment.

13. The system of claim 8, wherein the requirement pertains to a number of virtual central processing units of the virtual machine.

14. The system of claim 8, wherein the requirement pertains to a provider hardware profile.

15. A non-transitory computer-readable storage medium including instructions that, when executed by a processing device, cause the processing device to:
    receive, by the processing device, a request to launch a deployment of an application;
    identify a first virtual machine;
    retrieve from a second virtual machine, by the processing device, application deployment data for deploying the application within the first virtual machine;
    identify, by the processing device, a set of two or more cloud providers;
    determine a first subset of the set of cloud providers satisfying a requirement for the deployment of the application within the first virtual machine;
    determine, in view of a priority ranking criterion, a ranked list of cloud providers in the first subset;
    generate a probability distribution in view of the ranked list of cloud providers in the first subset;
    select, in view of the probability distribution, a cloud provider from the first subset to host the application within the first virtual machine; and
    deploy, in a cloud computing system of the selected cloud provider, an execution of the application within the first virtual machine.

16. The non-transitory computer-readable storage medium of claim 15, wherein the probability distribution assigns respective probabilities to cloud providers in a highest-ranked priority group of the ranked list of cloud providers.

17. The non-transitory computer-readable storage medium of claim 16, wherein the selected cloud provider is selected from a second-highest-ranked priority group of the ranked list of cloud providers when the cloud providers in the highest-ranked priority group are unavailable.

18. The non-transitory computer-readable storage medium of claim 15, wherein the priority ranking criterion pertains to at least one of cost, performance, reliability, or capacity.

19. The non-transitory computer-readable storage medium of claim 15, wherein the generating of the probability distribution is further in view of at least one of a date for the deployment or a time for the deployment.

20. The non-transitory computer-readable storage medium of claim 15, wherein the requirement pertains to a number of virtual central processing units of the virtual machine.

\* \* \* \* \*